(12) United States Patent
Hung

(10) Patent No.: US 9,802,267 B2
(45) Date of Patent: Oct. 31, 2017

(54) TIG TORCH CONNECTOR WITH HOSE MANAGEMENT AND TOOLLESS ASSEMBLY

(75) Inventor: Derek Yu-Fung Hung, Greenville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 528 days.

(21) Appl. No.: 13/567,131

(22) Filed: Aug. 6, 2012

(65) Prior Publication Data

US 2014/0038442 A1   Feb. 6, 2014

(51) Int. Cl.
| H01R 4/56 | (2006.01) |
| H01R 4/60 | (2006.01) |
| B23K 37/00 | (2006.01) |
| B23K 9/32 | (2006.01) |
| H01R 9/11 | (2006.01) |

(52) U.S. Cl.
CPC .............. B23K 9/323 (2013.01); H01R 9/11 (2013.01)

(58) Field of Classification Search
CPC ...... B23K 9/32; B23K 37/00; B23K 37/0268; B23K 37/0241; H01R 4/00; H01R 4/56; H01R 4/60
USPC ............ 219/137.31, 137.63, 137.62, 137.61, 219/137.9, 74, 120, 130.1, 133, 136; 439/259, 282, 253, 273, 277, 300, 302, 439/190–195
See application file for complete search history.

(56) References Cited

U.S. PATENT DOCUMENTS

| 3,771,099 | A | | 11/1973 | Dinse | |
| 4,210,796 | A | * | 7/1980 | Moerke | 219/137.63 |
| 4,600,824 | A | * | 7/1986 | Moerke | 219/137.63 |
| 4,714,438 | A | * | 12/1987 | Williams | 439/607.51 |
| 4,839,490 | A | * | 6/1989 | DeSaw | 219/74 |
| 6,078,023 | A | * | 6/2000 | Jones et al. | 219/137.63 |
| 6,797,923 | B2 | | 9/2004 | Delgado et al. | |

(Continued)

FOREIGN PATENT DOCUMENTS

| DE | 8403706 | 5/1985 |
| DE | 19533405 | 2/1997 |

OTHER PUBLICATIONS

ISR in PCT/US2013/053533 dated Mar. 5, 2014.
Written Opinion in PCT/US2013/053533 dated Feb. 6, 2015.
English language abstract for DE 19533405.

Primary Examiner — Michael Laflame, Jr.
(74) Attorney, Agent, or Firm — Fildes & Outland, P.C.

(57) ABSTRACT

A connector for connecting together a welding torch power cable including a threaded connector, a coolant line and a shielding gas line to a welding power and/or coolant source including a connector receptacle includes an electrically conductive tubular body having a front end and a back end. The tubular body front end is adapted to receive and connect to the power cable threaded connector. The tubular body back end is adapted to connect to the connector receptacle. The tubular body also includes a passageway therein to communicate shielding gas or coolant between the source and the torch. A hose connector is attached at an end of the passageway. A casing including a longitudinally extending tubular side wall terminates in front and back ends. A twist cap is releasably connectable to the back end of the casing. A cable cover adapter is releasably connectable to the front end of the casing.

12 Claims, 7 Drawing Sheets

(56) References Cited

U.S. PATENT DOCUMENTS

| | | |
|---|---|---|
| 7,105,766 B2 * | 9/2006 | Samler .......................... 219/75 |
| 7,253,373 B2 | 8/2007 | Delgado |
| 7,274,001 B1 * | 9/2007 | Cusick, III ............... 219/137.62 |
| 2003/0057196 A1 * | 3/2003 | Jones ....................... 219/137.42 |
| 2003/0209524 A1 | 11/2003 | Delgado et al. |
| 2005/0016966 A1 | 1/2005 | Delgado |
| 2006/0063396 A1 * | 3/2006 | Bankstahl ...................... 439/11 |
| 2007/0051715 A1 * | 3/2007 | Rehrig ...................... 219/137.9 |

* cited by examiner

TIG TORCH CONNECTOR WITH HOSE MANAGEMENT AND TOOLLESS ASSEMBLY

TECHNICAL FIELD

This invention relates to welding torches, and more particularly to a connector for TIG (Tungsten Inert Gas) welding.

BACKGROUND OF THE INVENTION

It is known in the art relating to TIG welding that welding current, shielding gas, and optionally cooling liquid are supplied to the welding torch through cables and hoses that are connected to a power source, gas source, and coolant system. Most liquid cooled TIG torches require three different hose/cable assemblies. A coolant hose delivers cold cooling fluid to the welding torch, a power cable assembly returns the cooling fluid to the cooler while cooling the conductor inside the cable, and a gas hose delivers shielding gas to the welding torch. Alternatively, the shielding gas may be delivered from the power source through the power cable. Air cooled TIG torches utilize up to two hose/cable assemblies since in this case it is only necessary to deliver welding current and shielding gas to the torch. Some welding torches also include a remote finger tip control, which further requires the use of an additional cable.

Typically, a sheath or similar cover is used to bundle and cover the cables/hoses between the welding torch and the supply source. However, conventional covers terminate before (commonly a few feet before) the cables/hoses make connection with the welding power source. This results in loose cable and hoses, which may become tangled or damaged. Also, the power cable, which may carry both welding current and coolant (or welding current and shielding gas), is typically connected to an adapter that interfaces with a TIG power source and separates the welding current and coolant/gas flow. These adapters route the coolant or gas flow to a designated hose through the side of the adapter. Since most of these adapters are generally circular in cross-section, the side connection of the coolant/gas hose to the adapter is sometimes used for leverage when tightening the adapter. Therefore, the coolant/gas hose connection to the adapter may become loosened or damaged. Further, most of these adapters require the use of multiple tools during assembly, which makes them difficult to operate or repair.

SUMMARY OF THE INVENTION

The present invention provides a connector for use in TIG welding that manages and protects all the hoses/cables of a TIG welding torch and that does not require tools for assembly. The present connector provides for attachment of a cable/hose sheath while allowing various cables/hoses to exit the connector in a controlled manner, resulting in improved hose management and reducing the possibility of hose damage. Further, the coolant and/or gas hose connections of the present connector are completely shielded by a housing, providing for better grip of the connector and preventing damage to the coolant/gas connections during use. Also, assembly and disassembly of the present connector does not require the use of any tools, with the exception of the connection of the power cable to the connector, which is a threaded connection that may be tightened or loosened with the aid of a wrench or similar.

More particularly, a connector for connecting together a welding torch power cable including a threaded connector, a coolant line and a shielding gas line to a welding power and/or coolant source including a connector receptacle includes an electrically conductive tubular body having a front end and a back end. The tubular body front end is adapted to receive and connect to the power cable threaded connector. The tubular body back end is adapted to connect to the connector receptacle. The tubular body also includes a passageway therein to communicate shielding gas or coolant between the source and the torch. A hose connector is attached at an end of the passageway and disposed along a side of the tubular body. A casing including a longitudinally extending tubular side wall terminating in front and back ends receives the tubular body. A twist cap is releasably connectable to the back end of the casing, and a cable cover adapter is releasably connectable to the front end of the casing. The welding torch power cable, coolant line and shielding gas line are thereby toollessly connectable to the welding power and/or coolant source via the connector according to the present invention.

The tubular sidewall may be slidable over the tubular body, and the tubular body may be insertable through the back end of the casing.

The hose connector may extend in an axial direction relative to the tubular body. The tubular body may include a second passageway therein to communicate shielding gas or coolant between the source and the torch, and a second hose connector may be attached at an end of the second passageway and disposed along a side of the tubular body. The second hose connector also may extend in an axial direction relative to the tubular body. The casing may include an axially disposed extension that covers the hose connector. The casing also may include an axially disposed extension that covers the second hose connector.

The back end of the casing and an inner surface of the twist cap may include a cooperative locking mechanism for connecting the twist cap to the casing. The front end of the casing may include a raised lip, and an inner surface of the cable cover adapter may include a corresponding groove for connecting the cable cover adapter to the casing. The cable cover adapter may include a raised lip for securing a cable cover to the connector. The front end of the casing may include a plurality of slots for passage of a tube or hose.

The tubular body may be made of copper or brass. The casing may be made of an insulating material.

These and other features and advantages of the invention will be more fully understood from the following detailed description of the invention taken together with the accompanying drawings.

DETAILED DESCRIPTION OF THE INVENTION

Figure 1:
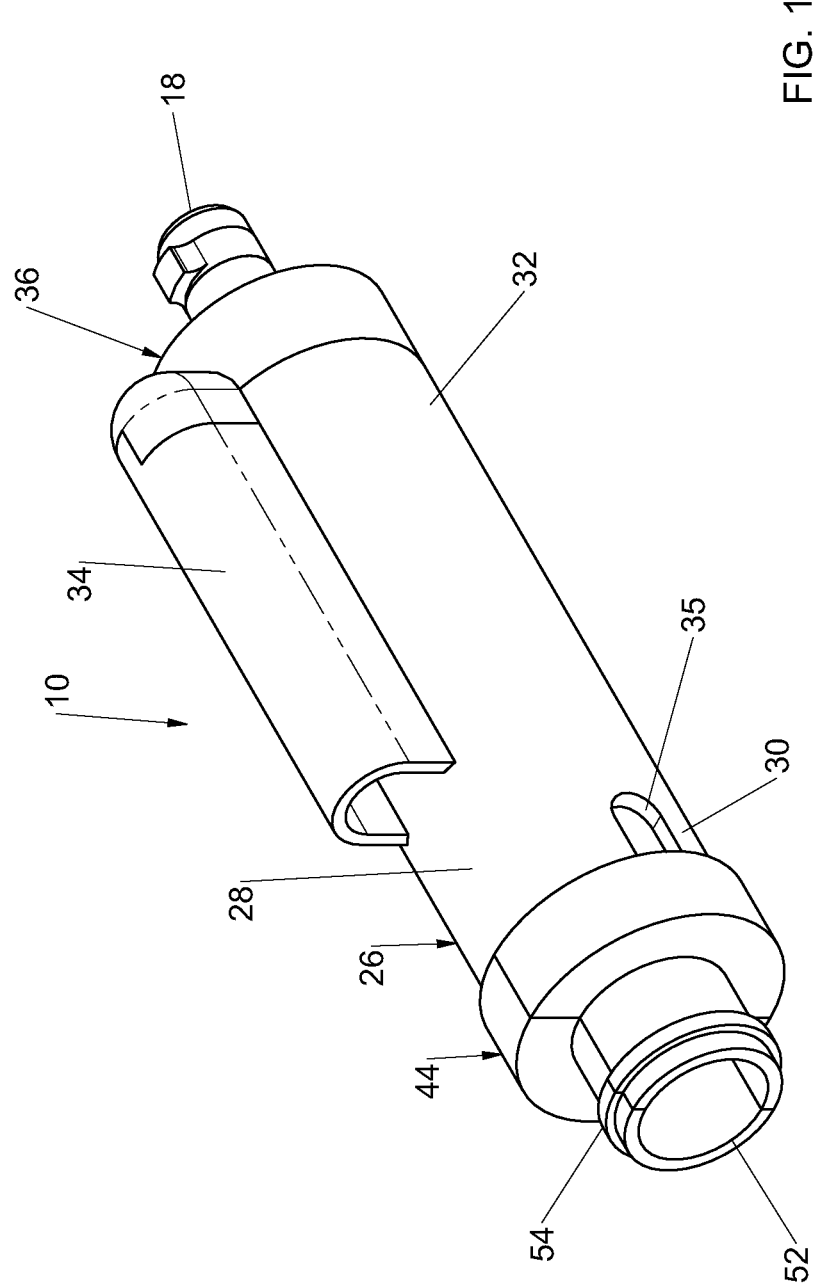
FIG. 1 is a perspective view of a connector in accordance with the present invention.

Referring now to the drawings in detail, numeral 10 generally indicates a TIG welding connector in accordance with the present invention. The connector 10 connects a plurality of hoses/cables including a welding torch power cable, a coolant line, and a shielding gas line between a TIG welding machine (providing welding power and/or a coolant source) and a TIG welding torch, while keeping the hoses/cables organized and protected from damage. The welding torch power cable, coolant line and shielding gas line are toollessly connectable to the welding power and/or coolant source via the connector 10.

Figure 2:
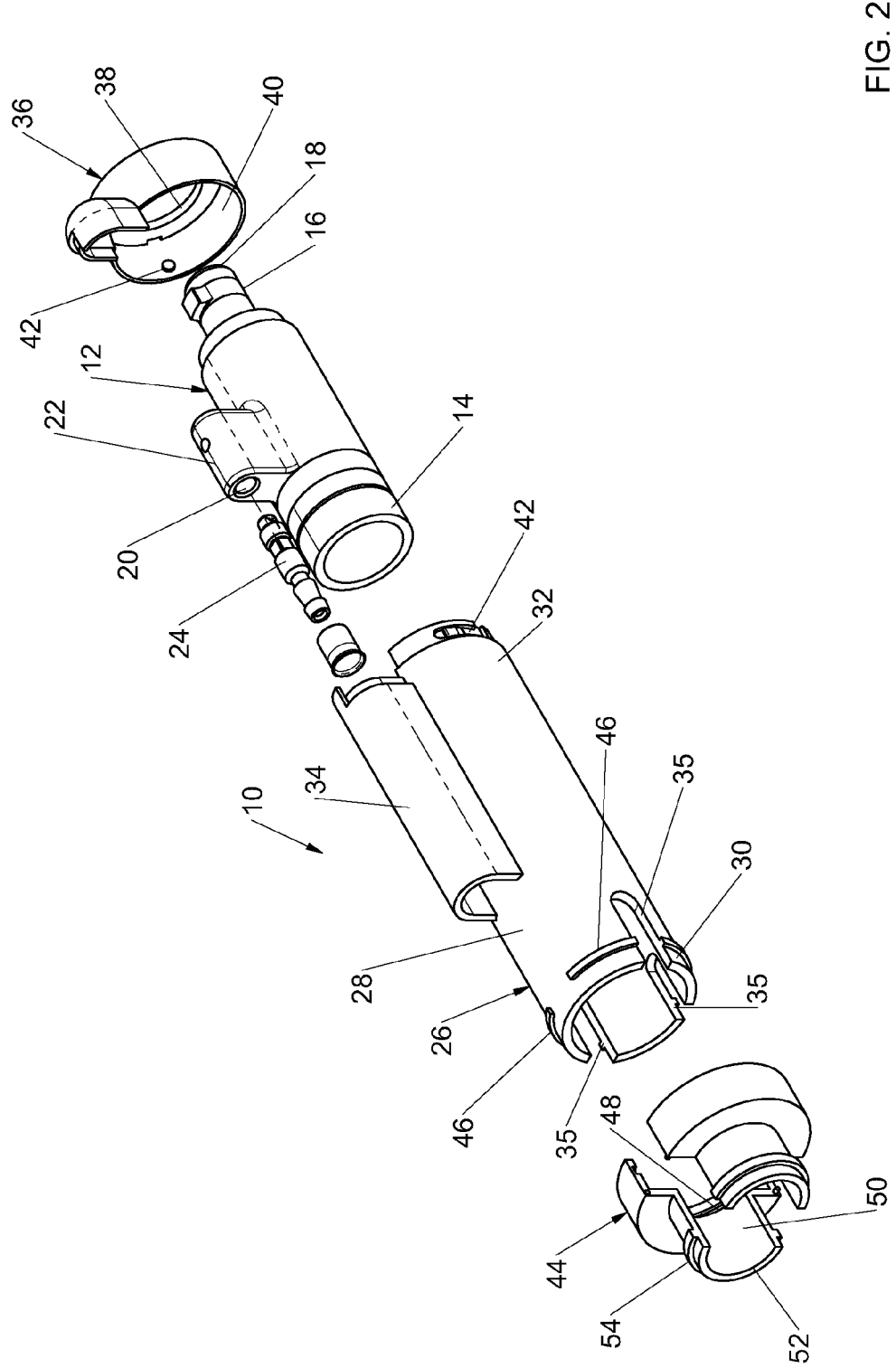
FIG. 2 is an exploded view of the connector of FIG. 1.
Figure 3:
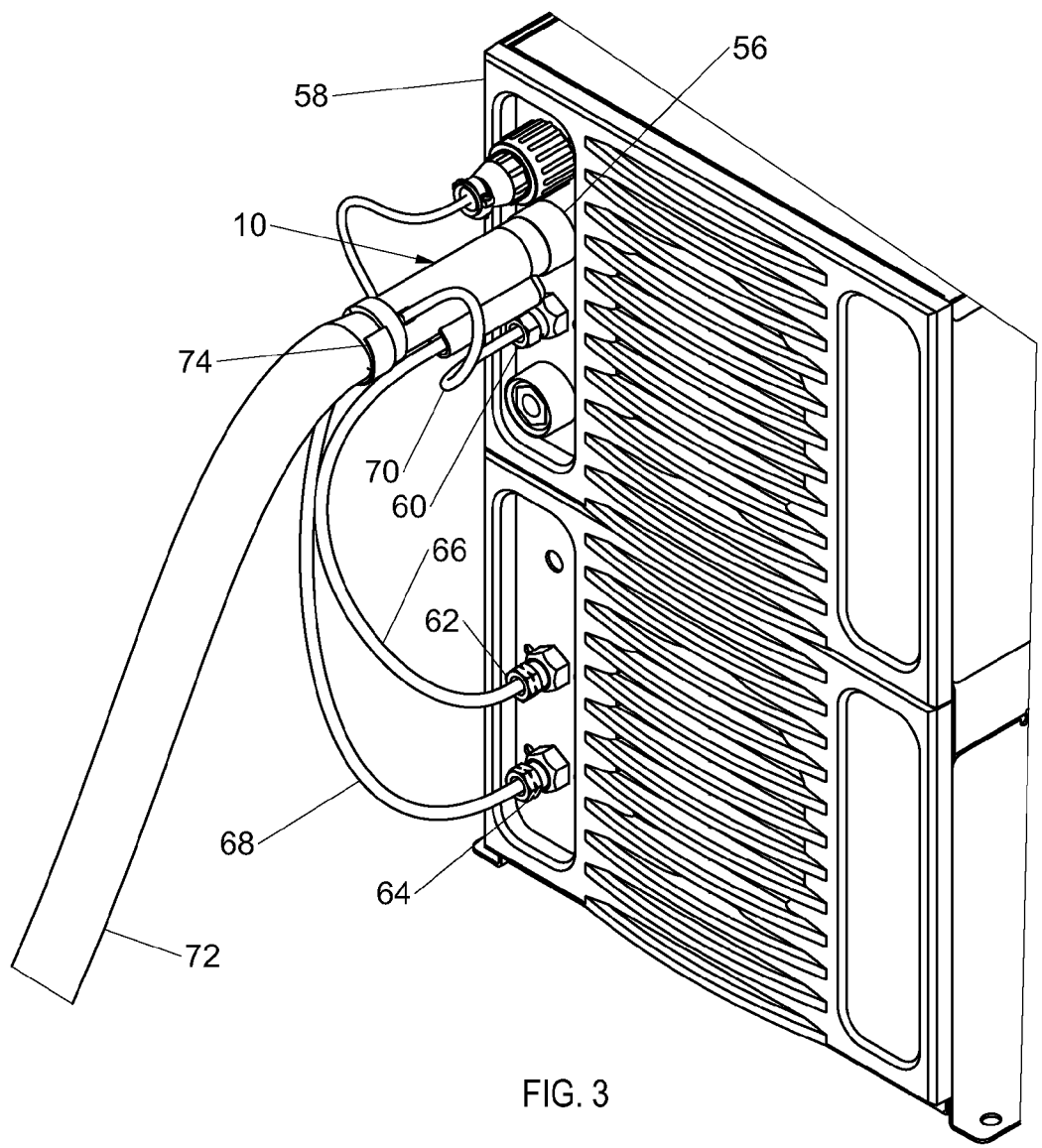
FIG. 3 is an environmental view of the connector of FIG. 1 connecting cable and hoses to a TIG welding machine.
Figure 4:
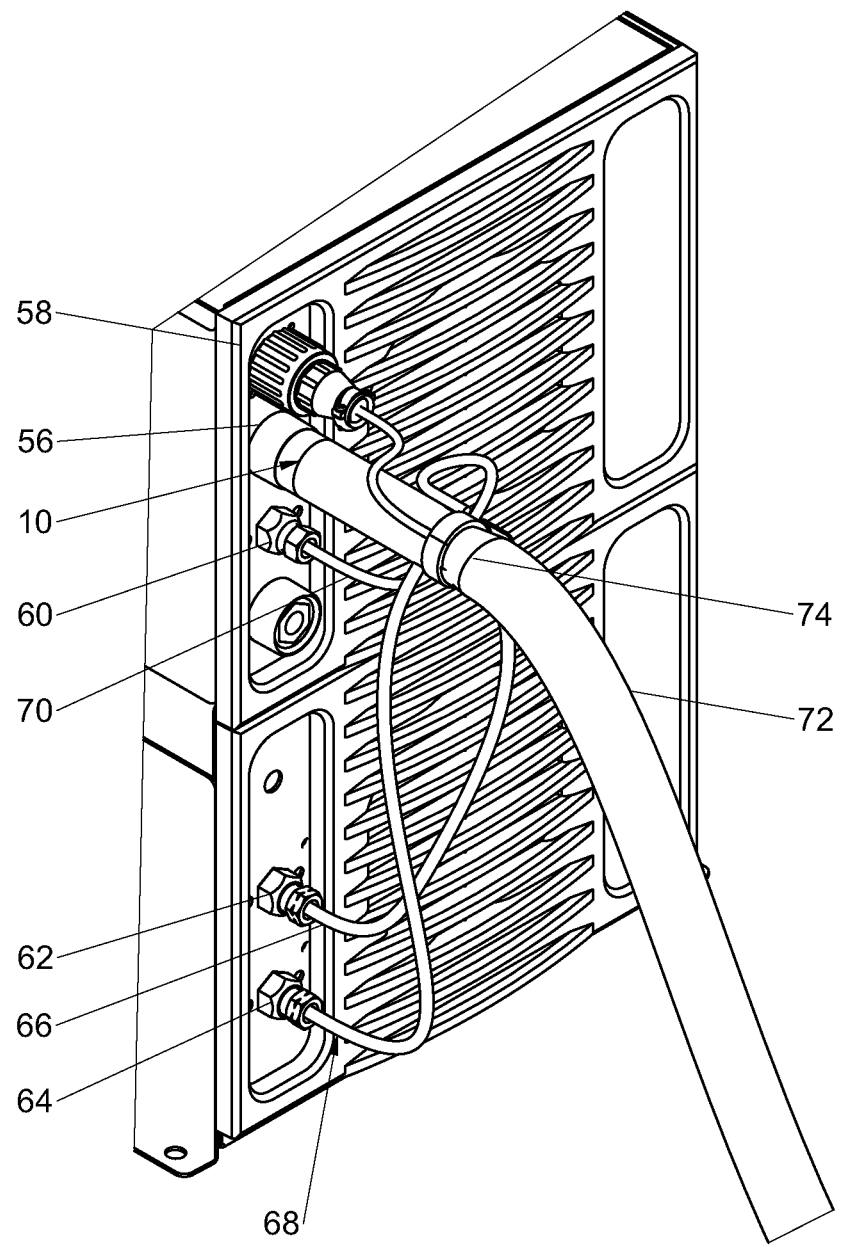
FIG. 4 is another environmental view of the connector of FIG. 1 connecting cable and hoses to a TIG welding machine.

Turning first to FIGS. 1 and 2, in one embodiment the connector 10 includes an electrically conductive tubular body 12 having a front end 14 and a back end 16. The tubular body 12 is made of a conductive metal and is preferably formed of copper and/or brass. The front end 14 of the tubular body 12 is adapted to receive and connect to a power cable threaded connector. More specifically, the front end 14 of the tubular body 12 may internally include a connector such as a female threaded hole (not shown in this embodiment) for connecting a threaded end of a power cable which is connected on an opposite end to a liquid cooled or air cooled TIG welding torch. The back end 16 of the tubular body 12 includes an electrical connector 18 for interlocking connection to the counterpart power output connector receptacle (and optionally including an integral shielding gas output, i.e. flow through gas) of a TIG welding machine. The electrical connector 18 of the tubular body 12 and the corresponding interfitting receptacle of the TIG welding machine may be, but is not limited to, a DINSE type connection, a TWECO type connection, or a cam-lock type connection, as long as the connection provides a firm interlocking connection between the tubular body and the TIG welding machine. The tubular body 12 further includes a passageway 20 therein to communicate shielding gas or coolant between the TIG welding machine (power/coolant source) and the TIG welding torch. The tubular body 12 also includes a protrusion 22 extending outwardly along the sidewall of the tubular body. The protrusion 22 internally defines an outer portion of the passageway 20. A hose connector 24 is attached to the tubular body 12 at an outer end of the passageway 20 in the protrusion 22. The hose connector 24 is disposed along the sidewall of the tubular body 12 and extends in an axial direction relative to the tubular body, i.e., generally parallel to the longitudinal axis of the tubular body. However, the hose connector 24 may extend at an angle relative to the longitudinal axis of the tubular body 12, i.e., the hose connector may be other than parallel to the longitudinal axis of the tubular body.

A casing 26 made of an insulating material and including a longitudinally extending tubular sidewall 28 terminating in front and back ends 30, 32, respectively, receives the tubular body 12 therein. As shown in FIG. 2, the tubular sidewall 28 is slidable over the tubular body 12, and the tubular body 12 is insertable through the back end 32 of the casing 26. Alternatively, the casing may be splitable into two halves and connected together with the tubular body therebetween. The casing 26 may generally correspond in shape to the tubular body 12 such that the tubular body 12 fits snugly and securely in the casing 26. The casing 26 also has an axially disposed extension 34 extending from the sidewall 28 that covers the hose connector 24 as well as the protrusion 22 of the tubular body 12. The front end 30 of the casing 26 may include a plurality of slots 35 for passage of cables, tubes, and/or hoses from outside of the casing 26 to the inside of the casing 26 as described in more detail below.

A twist cap 36 is releasably connected to the back end 32 of the casing 26. The twist cap 36 is generally circular in shape and includes an opening 38 through which the electrical connector 18 of the tubular body 12 extends. The back end 32 of the casing 26 and an inner surface 40 of the twist cap 36 include a cooperative locking mechanism 42 such as a bayonet type mount or similar for securing the twist cap 36 to the casing 26.

A cable cover adapter 44 is releasably connected to the front end 30 of the casing 26. The front end 30 of the casing 26 includes a raised lip 46 that engages a corresponding groove 48 on an inner surface 50 of the cable cover adapter 44 to secure the cable cover adapter 44 to the casing 26. The cable cover adapter 44 includes an opening 52 through which the power cable of the welding torch enters the casing 26 to connect to the tubular body 12. Other cables and/or hoses may also extend through the opening 52 of the cable cover adapter 44 as described in more detail below. The cable cover adapter 44 also includes a raised lip 54 adjacent the opening 52. A cable cover for covering the power cable and other cables/hoses extending from the welding torch to the connector 10 may be secured to the cable cover adapter 44 with a fastener such as a hook-and-loop fastener that is wrapped tightly around the cable cover adapter 44 on an inner side of the raised lip 54.

With reference to FIGS. 1 through 4, in use the electrical connector 18 of the connector 10 is inserted and secured in the corresponding receptacle 56 of the TIG welding machine 58. The TIG welding machine 58 provides a source of power, coolant, and/or shielding gas for TIG welding applications. In addition to the receptacle 56, which is the welding power supply output terminal of the TIG welding machine 58, the TIG welding machine includes a shielding gas output terminal 60, a coolant return terminal 62, and a coolant output terminal 64. A coolant return hose 66 is connected on one end to the hose connector 24 of the connector 10 and on the other end to the coolant return terminal 62 of the TIG welding machine 58. A coolant output hose 68 is connected on one end to the coolant output terminal 64 of the TIG welding machine 58 and extends into the connector 10 through one of the slots 35 in the casing 26, passes through the opening 52 in the cable cover adapter 52, and is connected on an opposite end to a welding torch (not shown). A shielding gas hose 70 is connected on one end to the shielding gas output terminal 60 of the TIG welding machine 58 and extends into the connector 10 through another of the slots 35 in the casing 26, passes through the opening 52 in the cable cover adapter 52, and is connected on an opposite end to the welding torch. A power cable (that is within a cable cover sheath 72) is connected on one end to the tubular body 12 of the connector 10, passes through the opening 52 in the cable cover adapter 52, and is connected on an opposite end to the welding torch. The cable cover sheath 72 covers the coolant output hose 68, the shielding gas hose 70 and the power cable from the connector 10 to the welding torch such that there are no lose hoses/cables between the TIG welding machine 58 and the welding torch. The cable cover sheath 72 is secured to the cable cover adapter 44 with a strip of hook-and-loop fastener 74 that is wrapped tightly around the cable cover adapter 44. Thus, the cables and hoses are well-managed, and safety in the welding environment is improved by reducing tripping and snagging hazards. When the welding torch is operated, welding power is supplied from the TIG welding machine 58 through the connector 10 and power cable to the welding torch, and shielding gas is supplied from the TIG welding machine 58 through the shielding gas hose 70 to the welding torch. Also, "cold" coolant is supplied from the TIG welding machine 58 through the coolant output hose 68 to the welding torch, and "warm" coolant is returned to the TIG welding machine 58 through the power cable, the coolant passageway 20 in the connector 10, and the coolant return hose 66 (whereby the coolant provides for cooling of the power cable).

Figure 5:
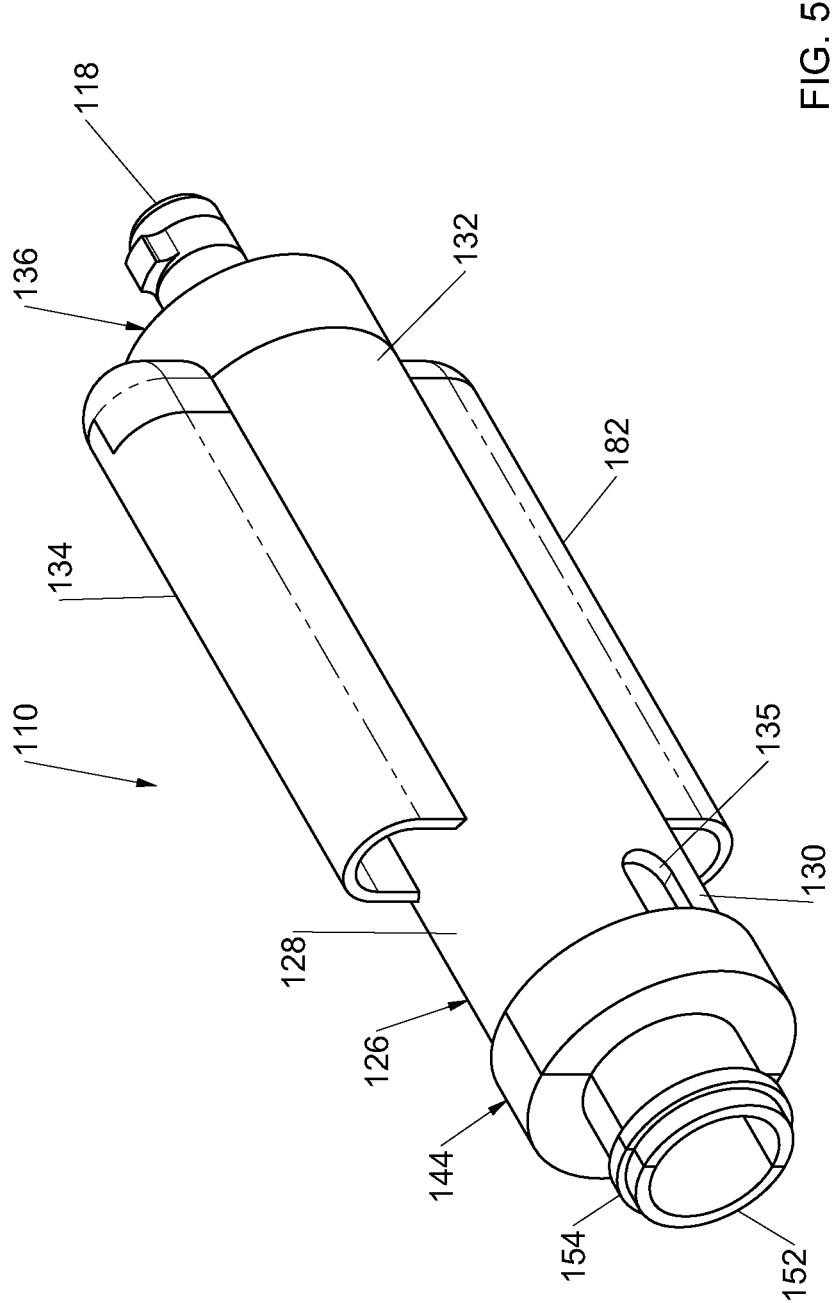
FIG. 5 is a perspective view of an alternative connector in accordance with the present invention.
Figure 6:
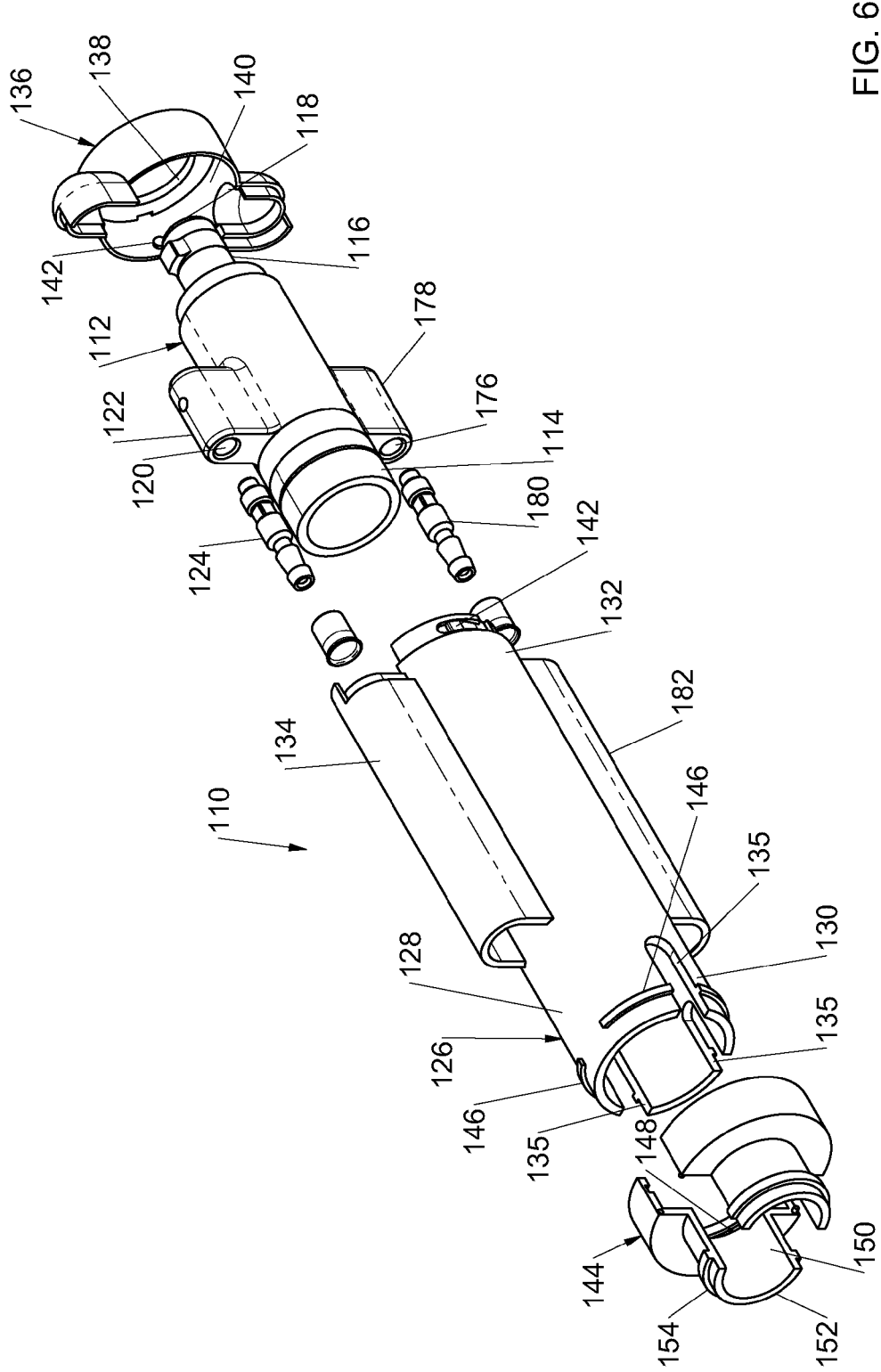
FIG. 6 is an exploded view of the connector of FIG. 5.
Figure 7:
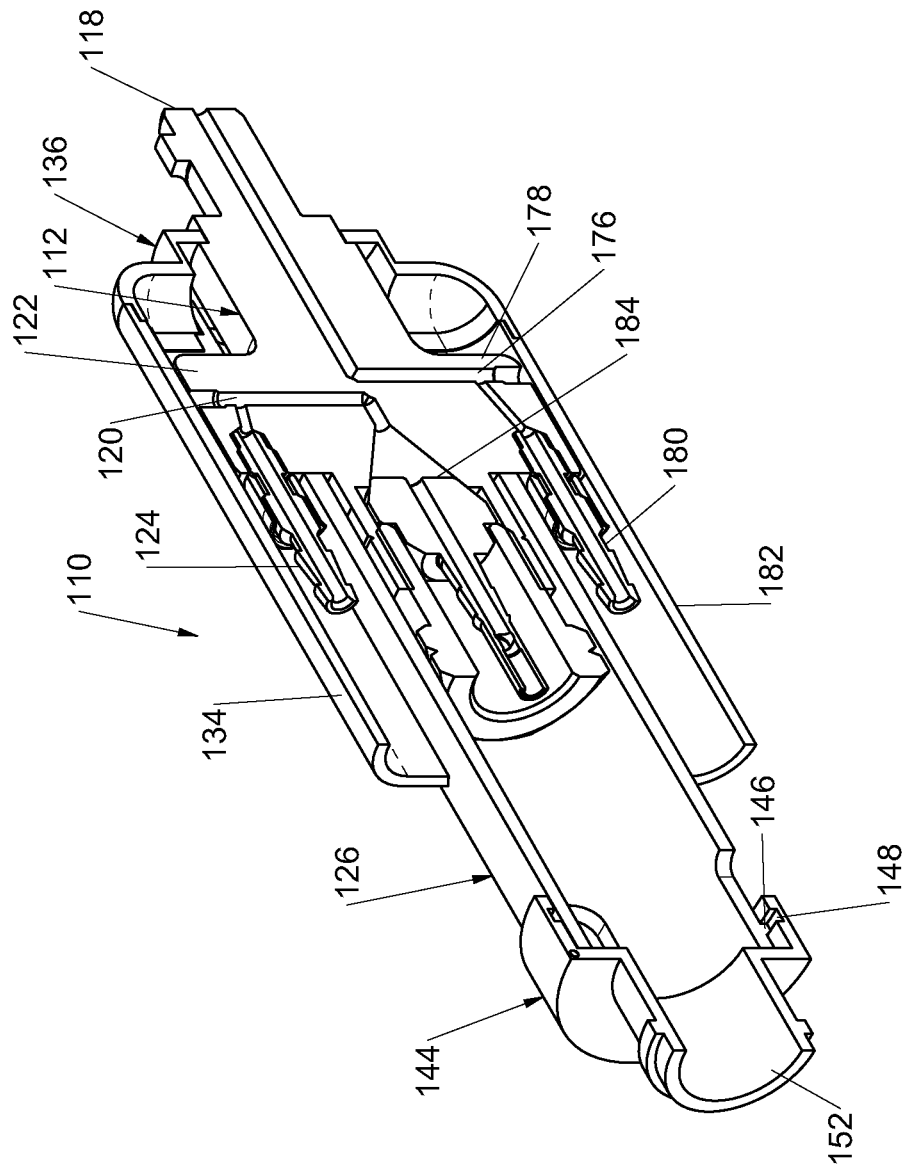
FIG. 7 is a cross-sectional view of the connector of FIG. 5.

Turing to FIGS. 5 through 7, in another embodiment the connector 110 includes a second passageway 176 therein the tubular body 112 to communicate shielding gas or coolant between the source and the torch. The tubular body 112 also includes a second protrusion 178 extending outwardly along the sidewall of the tubular body 112. The second protrusion 178 internally defines an outer portion of the second passageway 176. A second hose connector 180 is attached to the tubular body 112 at an outer end of the second passageway 176 in the second protrusion 178. The second hose connector 180 is disposed along a side of the tubular body 112 and extends in an axial direction relative to the tubular body 112, i.e., generally parallel to the longitudinal axis of the tubular body. However, the second hose connector 180 may extend at an angle relative to the longitudinal axis of the tubular body 112, i.e., the second hose connector may be other than parallel to the longitudinal axis of the tubular body. The second hose connector 180 may be disposed 180 degrees from the hose connector 124 in a radial direction along the sidewall of the tubular body 112. The casing 126 includes a second axially disposed extension 182 that covers the second hose connector 180. As shown specifically in FIG. 7, the first passageway 120 connects the power cable end 184 at the front end 114 of the tubular body 112 to the hose connector 124 for communication of coolant returning from the welding torch through the power cable back to the cooler/coolant source of the TIG welding machine. The second passageway 176 extends from the electrical connector 118 at the back end 116 of the tubular body 112 to the second hose connector 180 for communication of shielding gas from the TIG welding machine to the welding torch.

Otherwise, the connector 110 has all of the same features and the connector 10, and like reference numerals (e.g., 12, 112) in the drawings represent the same features common to both embodiments.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A connector for connecting together a welding torch power cable including a threaded connector, a coolant line and a shielding gas line to a welding power and coolant source including a connector receptacle, the connector comprising:
    a conductive tubular body having a front end and a back end;
    the tubular body front end receiving and being directly connected to the power cable threaded connector;
    the tubular body back end being releasably connected to the connector receptacle;
    the tubular body also including a passageway therein to communicate shielding gas or coolant between the power and coolant source and the welding torch power cable and downstream to a welding torch connected to the welding torch power cable;
    a hose connector attached at an end of the passageway and disposed along a side of the tubular body;
    a casing including a longitudinally extending tubular sidewall terminating in front and back ends;
    the tubular body being receivable in the casing, the tubular sidewall of the casing being slid over the tubular body, and the tubular body being inserted through the back end of the casing;
    a twist cap being releasably connectable to the back end of the casing; and
    a cable cover adapter being releasably connectable to the front end of the casing;
    whereby the welding torch power cable, coolant line and shielding gas line are toollessly connectable to the welding power and coolant source.

2. The connector of claim 1, wherein the tubular body includes a second passageway therein to communicate shielding gas or coolant between the source and the torch, and a second hose connector is attached at an end of the second passageway and disposed along a side of the tubular body.

3. The connector of claim 1, wherein the hose connector extends in an axial direction relative to the tubular body.

4. The connector of claim 2, wherein the second hose connector extends in an axial direction relative to the tubular body.

5. The connector of claim 1, wherein the casing includes an axially disposed extension that covers the hose connector.

6. The connector of claim 2, wherein the casing includes an axially disposed extension that covers the second hose connector.

7. The connector of claim 1, wherein the back end of the casing and an inner surface of the twist cap include a cooperative locking mechanism for connecting the twist cap to the casing.

8. The connector of claim 1, wherein the front end of the casing includes a raised lip, and an inner surface of the cable cover adapter includes a corresponding groove for connecting the cable cover adapter to the casing.

9. The connector of claim 1, wherein the cable cover adapter includes a raised lip for securing a cable cover to the connector.

10. The connector of claim 1, wherein the front end of the casing includes a plurality of slots for passage of a tube or hose.

11. The connector of claim 1, wherein the tubular body is made of a material selected from the group consisting of copper and brass.

12. The connector of claim 1, wherein the casing is made of an insulating material.

* * * * *